No. 883,676. PATENTED MAR. 31, 1908.
G. THERRIEN.
MONEY DRAWER.
APPLICATION FILED JULY 13, 1907.

5 SHEETS—SHEET 1.

No. 883,676. PATENTED MAR. 31, 1908.
G. THERRIEN.
MONEY DRAWER.
APPLICATION FILED JULY 13, 1907.

5 SHEETS—SHEET 2.

Witnesses Inventor
George Therrien
By D. A. Gowrick
Attorney

THE NORRIS PETERS CO., WASHINGTON, D. C.

No. 883,676. PATENTED MAR. 31, 1908.
G. THERRIEN.
MONEY DRAWER.
APPLICATION FILED JULY 13, 1907.

5 SHEETS—SHEET 3.

Witnesses
Inventor
George Therrien
By D. A. Gourick
Attorney

No. 883,676. PATENTED MAR. 31, 1908.
G. THERRIEN.
MONEY DRAWER.
APPLICATION FILED JULY 13, 1907.

5 SHEETS—SHEET 4.

Witnesses
Inventor
George Therrien
By D. A. Gowrick
Attorney

No. 883,676. PATENTED MAR. 31, 1908.
G. THERRIEN.
MONEY DRAWER.
APPLICATION FILED JULY 13, 1907.

5 SHEETS—SHEET 5.

Witnesses
Inventor
George Therrien
By D. A. Gourick
Attorney

UNITED STATES PATENT OFFICE.

GEORGE THERRIEN, OF OLDTOWN, MAINE.

MONEY-DRAWER.

No. 883,676.   Specification of Letters Patent.   Patented March 31, 1908.

Application filed July 13, 1907. Serial No. 383,645.

*To all whom it may concern:*

Be it known that I, GEORGE THERRIEN, a subject of the King of Great Britain, and residing at Oldtown, in the county of Penobscot and State of Maine, have invented certain new and useful Improvements in Money-Drawers, of which the following is a specification.

My invention relates to money drawers for use in barber shops, small stores, etc., where it is desired to keep the receipts of the several operatives separate so as to be able to check up mistakes made in making change, receiving bad money, etc., and charge it against the one responsible.

To this end my invention consists in providing a cabinet furnished with a plurality of money drawers each of said drawers being locked by a check controlled mechanism so arranged that a separate device is provided for each drawer, the checks for each operative being different in color from the checks of the other operatives and the check for the last sale being visible through a transparent panel so that the purchaser and proprietor can see that a check for the proper amount has been used by the operative.

Provision is also made for opening all of the drawers simultaneously with a master key so that the proprietor may check up the receipts, and also for opening the casing containing the check controlled apparatus to remove the checks.

My invention will be described in detail hereinafter and illustrated in the accompanying drawings in which—

Figure 1:
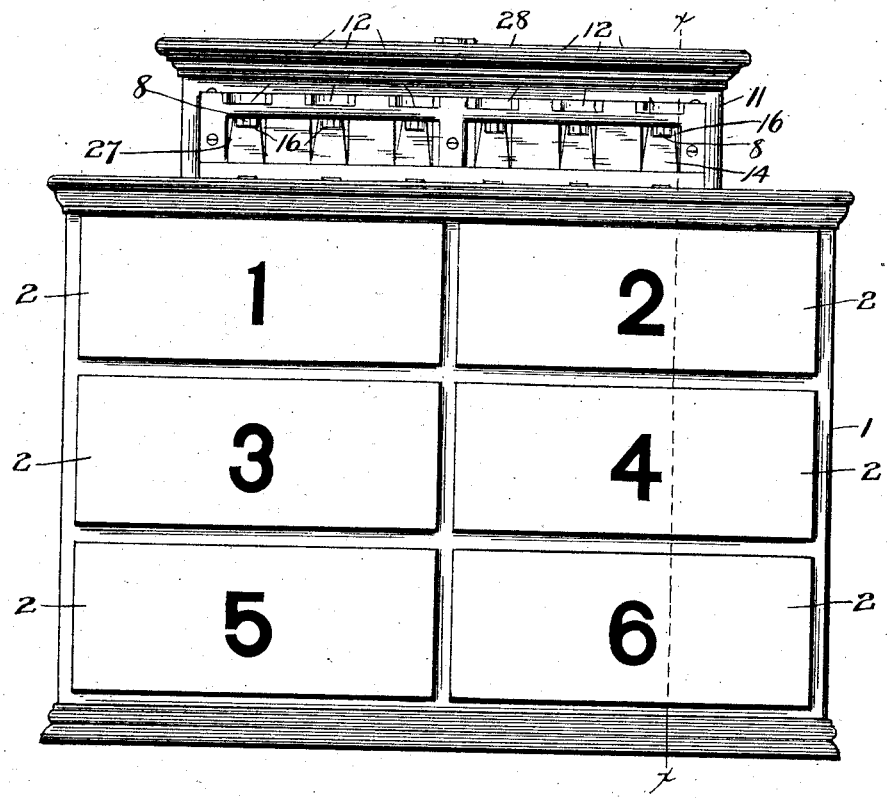
Figure 8:
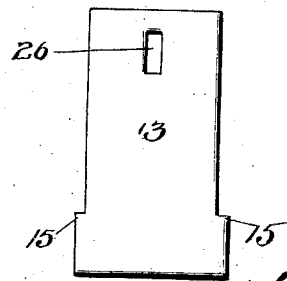
Figure 2:
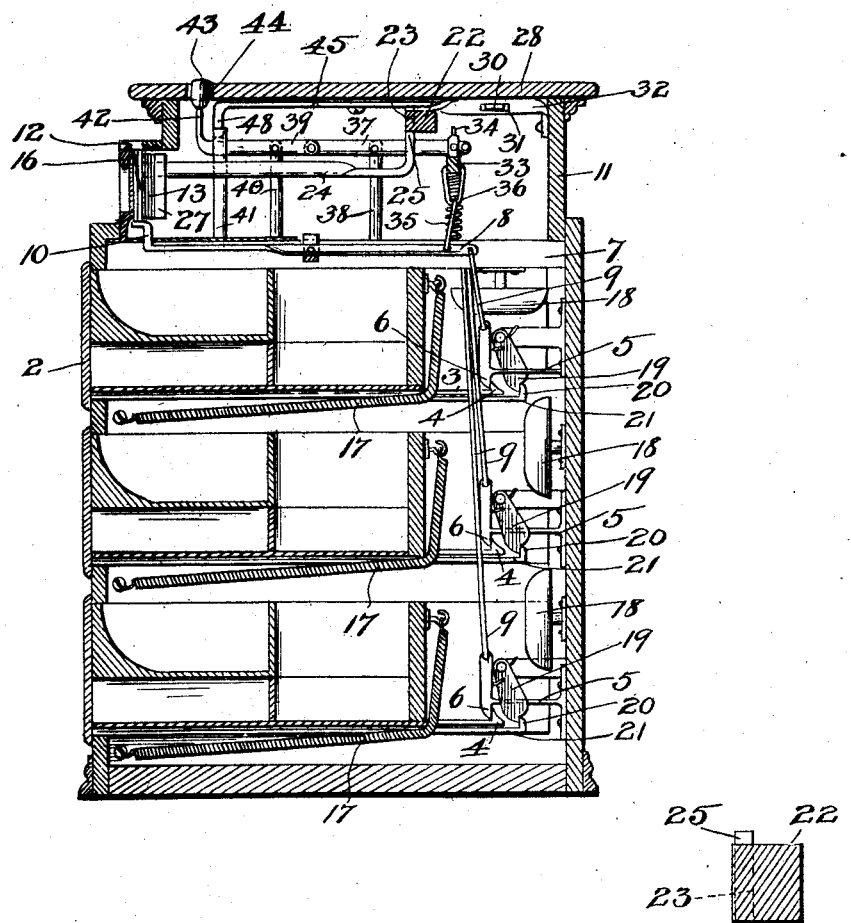
Figure 6:
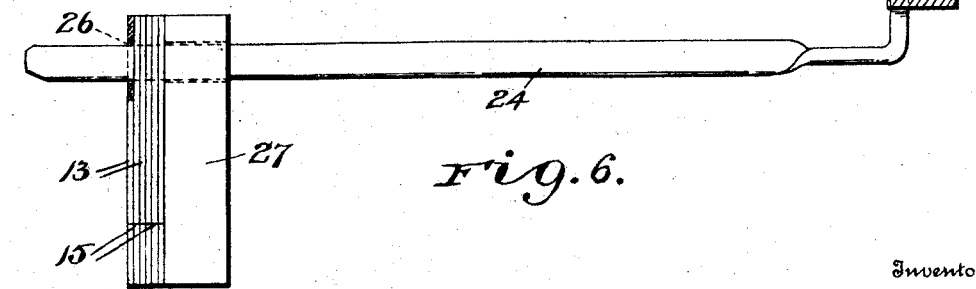
Figure 3:
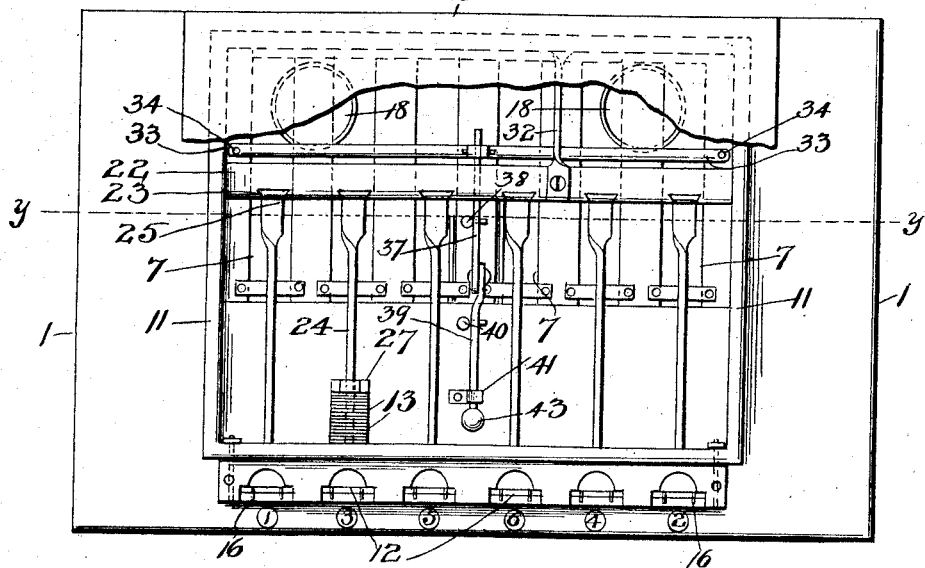
Figure 5:
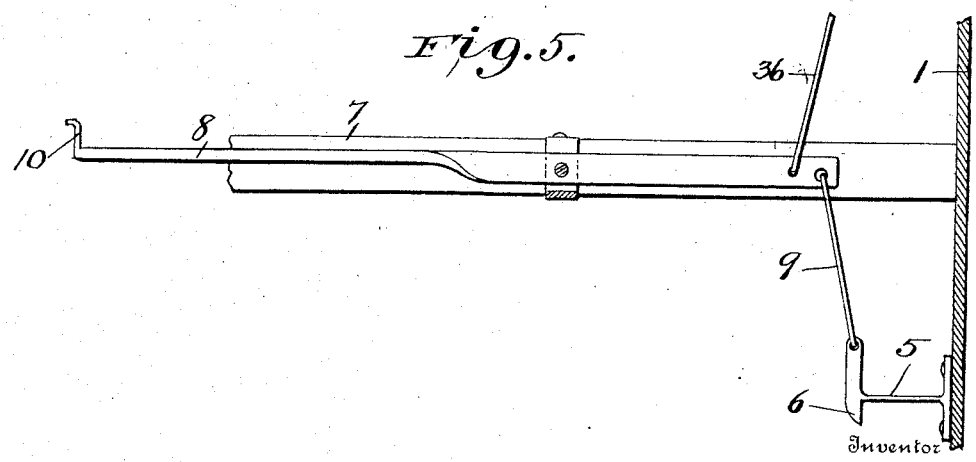
Figure 4:
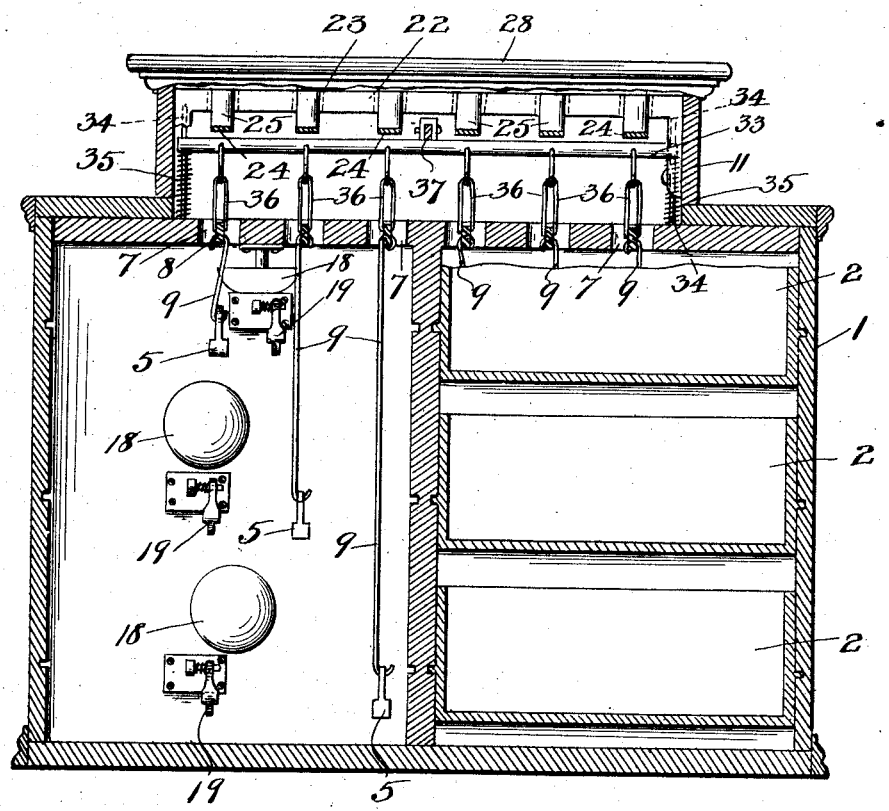
Figure 10:
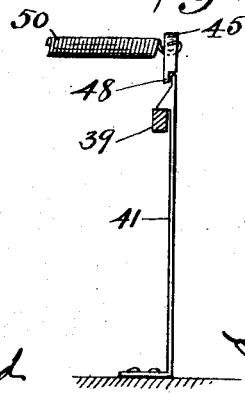
Figure 7:
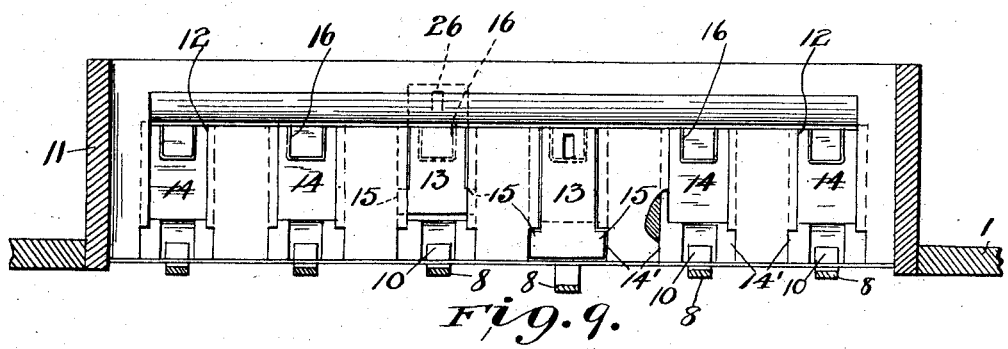
Figure 9:
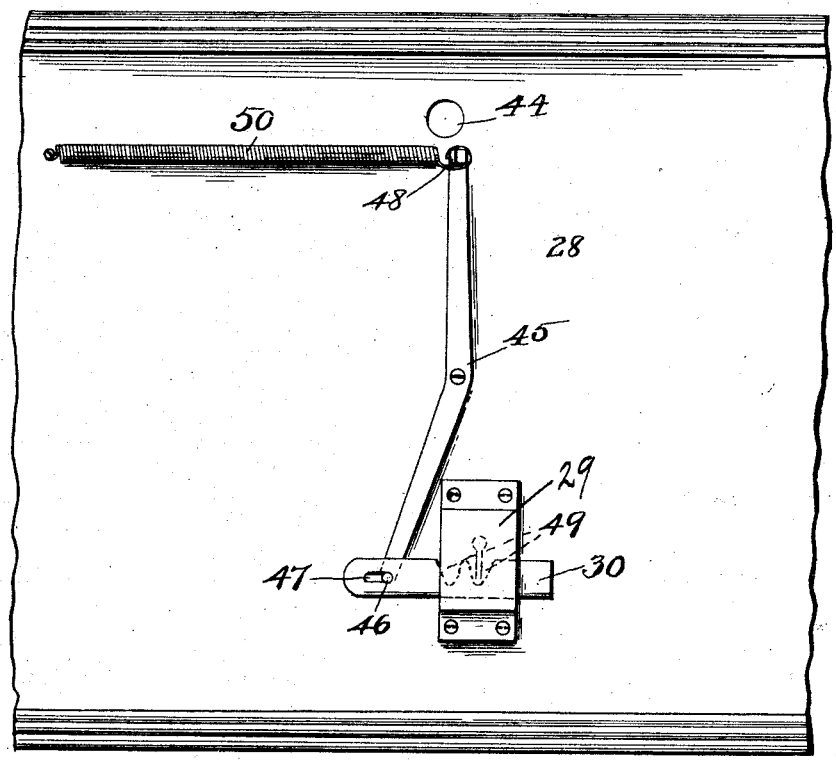

Figure 1 is a front view of my improved money drawer cabinet, Fig. 2, a cross section on the line *x—x* of Fig. 1, Fig. 3, a top plan view with the top of the check controlled mechanism casing partly broken away, Fig. 4, a view on the line *y—y* of Fig. 3, Fig. 5, a detail view of one of the drawer operating levers, Fig. 6, a detail view of one of the check receivers, Fig. 7, a view in elevation of the inside of the check slides, and Fig. 8, a detail of one of the checks.

In the drawings similar reference characters indicate corresponding parts throughout the several views.

1 indicates a cabinet having a plurality of money drawers 2 contained therein, there being six drawers shown in the device selected for illustration but it will be understood that this number may be increased or diminished as desired. The drawers 2 are so constructed that they can be opened only by the mechanism hereinafter described after having been closed.

Secured to the rear end of each drawer is a bar 3 having a lug or projection 4 on its free end and secured to the inside of the casing 1 at its back is a spring catch 5 having a lug or projection 6 to engage the lug or projection 4 when the drawer 2 is in a closed position.

The top of cabinet 1 is provided with a plurality of slots 7 in each of which is fulcrumed a lever 8 having rod 9 connecting one end thereof with one of the spring catches 5. The free end of each lever 8 has an upwardly extending portion 10.

11 indicates a casing secured to the top of cabinet 1 and inclosing the slots 7 and levers 8. The front of casing 11 is provided with a plurality of slides 12, one for each lever 8, to receive checks 13. The front of slides 12 are open and provided with transparent plates 14 so that the amount of the check therein is visible. The slides 12 are cut away at their lower ends as shown at 14 and the checks 13 have their lower ends provided with projections 15 to engage the slides 12 and their upper portions narrower so that when inserted in the slides the projections 15 only engage them and guide the checks downwardly until its lower end engages the upwardly extending portion 10 of lever 8 and depresses it, after which the projections 15 being opposite the cut away portions 14 the check is thrown out of the slide by means of a spring 16 secured to the front thereof.

When the lever 8 is actuated by the check 13, as above described, the lug 6 on spring catch 5 is raised from engagement with the lug 4 on bar 3, and the drawer 2 is released to the action of coil spring 17 secured thereto and to the cabinet 1. When the drawer 2 is opened under the impulse of spring 17 a bell 18 is sounded by a spring actuated clapper 19 which is engaged by a projection 20 on bar 21 secured to the drawer.

22 indicates a bar secured across casing 11 and having a plurality of dovetail notches 23 therein, one of said notches being opposite each slide 12. 24 indicates rods having upwardly turned and beveled ends 25 to fit notches 23, the front ends of said rods extending to said slides and adapted to engage the holes 26 in check 13 when thrown out of slide 12 by means of spring 16 as above described.

27 indicates a weight slidably mounted on each rod 24 that is pushed back as the rod fills with checks and causes the checks to be closely assembled on the rod.

It will be understood from this construction that when the drawers 2 are in a closed position they are locked by means of spring catches 5 and that any individual drawer may be opened by inserting a check 13 in the slide 12 corresponding thereto. By providing checks 13 of distinguishing colors and each operative provided with checks of one kind only, and for different amounts, and having one of the drawers 2 assigned to him for his exclusive use, it will be understood that any errors made by the operatives in making change, or in accepting counterfeit or foreign currency can be traced directly to him so that he can be charged therewith.

The top 28 of casing 1 is removable and held in a closed position by means of a lock 29 having a sliding bolt 30 that engages a slot 31 in bar 32 secured to the side of casing 1 and to the bar 22.

33 indicates a bar slidably mounted on pins 34 and 35 an expansible coil spring on each pin 34 bearing against the bar and normally raising it.

36 indicates flexible elements connecting bar 33 with each lever 8. A lever 37 fulcrumed on post 38 has one end pivotally secured to bar 33 and its other end secured to another lever 39 fulcrumed on another post 40.

41 indicates a spring catch to engage the free end of lever 39 and hold it depressed and retain the bar 33 in its depressed position. The end of lever 39 is bent upwardly as shown at 42 and has a button or knob 43 on its free end that seats in hole 44 in top 28.

45 indicates a lever fulcrumed on the inner side of top 28 and having a pin 46 on the end of one arm that engages a slot 47 in the end of lock bolt 30, while the end of its other arm extends downwardly as shown at 48 and engages the spring catch 41. The bolt 30 is formed with two notches 49 to receive the key in operating it, one turn of the key moving the lever far enough to disengage the catch 41 from lever 39 and release the bar 33 to the action of coil springs 35 and through the instrumentality of flexible elements 36 lifting the ends of levers 8 and the spring catches 5 so as to release all of the drawers. Another turn of the key moves the bolt 30 far enough to release it from engagement with slot 31 and the top may be removed. When the casing 11 and drawers 2 are open as above described the proprietor can verify the amount in each drawer with the checks 13 strung on the rod 24 corresponding thereto and should there be any mistakes they may be charged against the operative responsible therefor. If the cash is removed from any of the drawers a corresponding amount in checks is removed from the rods after removing the rods from bar 22 by raising them from notches 23.

50 indicates a spring secured to the downwardly extending portion 48 and to the top 28 to hold it normally from an operative position.

I am aware that individual money drawers have been patented in which each operative opens his drawer by means of an individual key and also that a single money drawer has been patented which is operated by means of a check that records the amount of the purchase and simultaneously opens the drawer and I do not make claim to this construction, but do claim to be the originator of the construction set out in the claims hereto annexed.

Having thus described my invention what I claim is—

1. In combination with a cabinet, and a plurality of drawers in said cabinet, check controlled operating devices for the individual drawers, and a collective operating device for simultaneously opening all of the drawers, substantially as shown and described.

2. In combination with a cabinet, and a plurality of drawers in said cabinet, spring catches for engaging the drawers and holding them in a closed position, levers operatively connected with said spring catches to disengage them from the drawers, checks to engage said levers and operate them, a spring actuated bar operatively secured to said levers to simultaneously operate them to open all of the drawers, and means to hold the bar in an inoperative position, substantially as shown and described.

3. In combination with a cabinet, and a plurality of drawers in said cabinet, spring catches for engaging the drawers and holding them in a closed position, levers operatively connected with said spring catches to disengage them from the drawers, perforated checks to engage said levers and operate them, and rods to engage the holes in said checks, substantially as shown and described.

4. In combination with a cabinet, and a plurality of drawers in said cabinet, spring catches for engaging the drawers and holding them in a closed position, levers operatively connected with said spring catches to disengage them from the drawers, perforated checks to engage said levers and actuate them, a bar secured to the cabinet, and rods removably secured to said bar to receive said perforated checks, substantially as shown and described.

5. In combination with a cabinet, and a plurality of drawers in said cabinet, spring catches for engaging the drawers and holding them in a closed position, levers operatively connected with said spring catches to disengage them from the drawers, means to actuate the individual levers, a bar slidably mounted, flexible elements connecting said bar and the individual levers, springs engaging the bar to normally raise it and the levers to release the spring catches from engagement with the drawers, and means to hold the bar depressed against the action of the springs, substantially as shown and described 6. In combination with a cabinet, and a plurality of drawers in said cabinet, spring catches for engaging the drawers and holding them in a closed position, levers operatively connected with said spring catches to disengage them from the drawers, means to actuate the individual levers, a bar slidably mounted and operatively connected with said levers, springs engaging the bar to normally raise it and the levers to release the spring catches from engagement with the drawers, levers suitably fulcrumed and pivotally secured together, the free end of one lever secured to the bar, a spring catch to engage the free arm of the other lever, a lever suitably fulcrumed and having one arm engaging the spring catch aforesaid, and means to actuate said lever to release the spring catch from engagement with the lever aforesaid, substantially as shown and described.

7. In combination with a cabinet, and a plurality of drawers in said cabinet, spring catches for engaging the drawers and holding them in a closed position, levers operatively connected with said spring catches to disengage them from the drawers, perforated checks to engage said levers and actuate them, a bar secured to the cabinet having dovetail notches therein, rods having beveled extensions to engage said notches, said rods being adapted to receive and hold said perforated checks, a bar slidably mounted and operatively connected with said levers, springs engaging the bar to normally raise it and the levers to release the spring catches from engagement with the drawers, levers suitably fulcrumed and pivotally secured together, the free end of one lever secured to the bar, a spring catch to engage the free arm of the other lever, a lever suitably fulcrumed and having one arm engaging the spring catch aforesaid, and means to actuate said lever to release the spring catch from engagement with the lever aforesaid, substantially as shown and described.

8. In combination with a cabinet, and a plurality of drawers therein, bars secured to said drawers having projections thereon, spring catches secured to the cabinet and engaging the projections on the bars, levers suitably fulcrumed on the top of the cabinet, a rod connecting each of said levers with one of said catches, the free ends of the levers having an upwardly extending portion, slides arranged adjacent to the upwardly extending ends of the levers having cut away portions, perforated checks provided with projections to engage said slides and register with said cut away portions, said checks being adapted to engage the ends of said levers to depress them and release the spring catches from engagement with the drawers aforesaid, and rods secured with their free ends adjacent to said slides to engage the perforations in the checks and hold them, substantially as shown and described.

9. In combination with a cabinet, and a plurality of drawers therein, bars secured to said drawers having projections thereon, spring catches secured to the cabinet and engaging the projections on the bars, levers suitably fulcrumed in the top of the cabinet, a rod connecting each of said levers with one of said catches, the free ends of the levers having an upwardly extending portion, slides arranged adjacent to the upwardly extending ends of the levers having cut away portions, perforated checks provided with projections to engage said slides and register with said cut away portions, said checks being adapted to engage the ends of said levers to depress them and release the spring catches from engagement with the drawers aforesaid, a casing on top of said cabinet and surrounding said levers, and having a removable top, a bar secured to said casing having dovetail notches therein, rods having beveled extensions to engage said notches, said rods being adapted to receive and hold said perforated checks, a bar slidably mounted and operatively connected with said levers, springs engaging the bar to normally raise it and the levers to release the spring catches from engagement with the drawers, levers suitably fulcrumed and pivotally secured together, the free end of one lever secured to the bar, a spring catch to engage the free arm of the other lever, a lever fulcrumed on the removable top of the casing and having one arm engaging the spring catch aforesaid, a lock for securing the removable top of the casing, the lock bolt having a slot therein, and the lever fulcrumed on the top provided with a pin engaging the slot in the bolt, substantially as shown and described.

In testimony whereof I hereto affix my signature in the presence of two witnesses.

GEORGE THERRIEN.

Witnesses:
FRED T. TIBBETTS,
JESSIE M. FITZ-GERALD.